United States Patent [19]
Serizawa

[11] Patent Number: 5,262,801
[45] Date of Patent: Nov. 16, 1993

[54] IMAGE RECORDING APPARATUS
[75] Inventor: Yoji Serizawa, Yokohama, Japan
[73] Assignee: Canon Kabushiki Kaisha, Tokyo, Japan
[21] Appl. No.: 573,686
[22] Filed: Aug. 28, 1990
[30] Foreign Application Priority Data
Aug. 31, 1989 [JP] Japan .................. 1-223113
[51] Int. Cl.5 .............................. H04N 1/21
[52] U.S. Cl. .................... 346/108; 358/298
[58] Field of Search ........ 346/108, 107 R, 1.1, 346/160; 358/296, 300, 302, 298

[56] References Cited
U.S. PATENT DOCUMENTS
4,799,069 1/1989 Sasaki et al. .................. 346/108
4,905,023 2/1990 Suzuki .......................... 346/108

FOREIGN PATENT DOCUMENTS
3738469 5/1988 Fed. Rep. of Germany .
62-280040 12/1987 Japan .

OTHER PUBLICATIONS
L. W. Bassetti, et al., "Print Enhancement for Laser Printers", IBM Technical Disclosure Bulletin, vol. 27, No. 5, Oct. 1984, pp. 3071-3072.

Primary Examiner—Mark J. Reinhart
Attorney, Agent, or Firm—Fitzpatrick, Cella, Harper & Scinto

[57] ABSTRACT

An image recording apparatus includes a beam generator for emitting a light beam modulated in accordance with image information on an image carrier, and a control unit for controlling an ON time of a beam corresponding to one pixel and generated by the beam generator.

5 Claims, 9 Drawing Sheets

IMAGE RECORDING APPARATUS

BACKGROUND OF THE INVENTION

1. Field of the Invention

The present invention relates to an image recording apparatus capable of changing over a recording resolution.

2. Related Background Art

Conventional image recording apparatuses capable of changing over recording resolutions are disclosed in U.S. patent applications Ser. Nos. 563,859 filed Aug. 7, 1990 as a continuation of Ser. No. 350,649 filed May 11, 1989, Ser. No. 392,036 filed Aug. 9, 1989, Ser. No. 407,311 filed Sep. 14, 1989, and Ser. No. 412,986 filed Sep. 26, 1989.

FIG. 8 is a perspective view for explaining an image forming theory in a conventional image printing apparatus. This apparatus includes a photosensitive drum 100 serving as an electrostatic latent image carrier which is rotated at a constant speed in a direction indicated by an arrow.

A semiconductor laser 101 outputs a laser beam 105 which is ON/OFF-modulated on the basis of print information input from a host computer (not shown) or the like. A polygonal mirror 102 is rotated by a scanner motor 103 at a predetermined speed to deflect the laser beam 105 incident through an optical system such as a collimator lens. A latent image is formed on the photosensitive drum 100 through a focusing lens 106 having $f-\theta$ characteristics.

A beam detector 104 receives the laser beam 105 scanned on the photosensitive drum 100 from the left to the right prior to scanning of an image write area and outputs a beam detection signal to a controller (not shown) to generate a horizontal sync signal BD which defines a write start position in the main scanning direction.

When a printing sequence is started, the laser beam 105 modulated on the basis of image information is incident from the laser 101 to the photosensitive drum 100 serving as a latent image carrier through the rotating polygonal mirror 102. The laser beam 105 is scanned on the photosensitive drum 100 to form a latent image. The latent image is visualized into a toner image by a developing unit (not shown). The toner image is transferred to and fixed on a recording sheet, thereby forming an image.

FIG. 9 is a control block diagram for explaining a control arrangement of the image printing apparatus shown in FIG. 8. A printer controller 200 develops image information received from a host computer or the like into a bit map in an internal memory. Image data 206 and an image clock 207 for latching this image data are output to a printer engine image control circuit 204 in synchronism with the BD signal 212 obtained from a printer engine BD signal detector 213. At the same time, the printer controller 200 performs serial communication with a print engine print control circuit 201 through a serial communication bus 205.

A scanner driver 202 controls a scanner motor 103 shown in FIG. 8 and rotates it at a predetermined speed on the basis of a motor control signal 208 output from the print control circuit 201.

A laser driver 203 controls emission of a laser beam from the semiconductor laser 101 (FIG. 8) on the basis of a laser control signal 209 output from the print control circuit 201.

The image control circuit 204 receives image data 206 output in synchronism with the image clock 207 from the printer controller 200 and outputs a laser drive signal 211 to the laser driver 203.

The image control circuit 204 receives an image control signal 210 from the print control circuit 201 and performs signal processing associated with resolution change-over.

FIG. 10 is a block diagram of an arrangement of the image control circuit 204 (FIG. 9) which is exemplified by a D flip-flop DFF.

FIG. 11 is a timing chart for explaining operations of the respective parts in FIG. 9, and the same reference numerals as in FIG. 9 denote the same parts in FIG. 11.

When the beam detector 104 shown in FIG. 8 receives the laser beam 105, the BD signal detector 213 shown in FIG. 9 outputs the BD signal 212 to the printer controller 200. The image data 206 is output to the image control circuit 204 in synchronism with the image clock 207. In this case, the printer controller 200 serially transmits control information (e.g., a resolution change-over signal) to the print control circuit 201.

In response to this control information, the print control circuit 201 performs change-over processing such as speed change-over of the scanner driver 202. Therefore, an image can be printed at different resolutions in a single printing processor.

In the above apparatus, however, when the resolution is changed from 300 DPI (dots/inch) to 600 DPI, the size of one pixel of a laser beam radiated on the photosensitive drum is not set to be ¼ the size of the 300 (DPI) resolution, thus forming a larger image. For this reason, when a line obtained by drawing a one-line image is formed, it becomes thick, thus greatly impairing quality of ruler or the like.

SUMMARY OF THE INVENTION

It is an object of the present invention to provide an image recording apparatus free from all the conventional drawbacks described above.

It is another object of the present invention to provide an image recording apparatus which can greatly improve image quality and can prevent image degradation caused by resolution change-over, by adjusting a beam ON time of each pixel in accordance with designated resolution information.

It is still another object of the present invention to provide an image recording apparatus which can greatly improve image quality and prevents image degradation caused by resolution change-over by keeping a beam ON within a shorter period of time than one period of an image clock.

It is still another object of the present invention to provide an image recording apparatus which can greatly improve image quality and can prevent image degradation caused by resolution change-over by setting a duty ratio of an image clock corresponding to a designated resolution in accordance with the resolution.

The above and other objects, features, and advantages of the present invention will be apparent from the following detailed description and the appended claims in conjunction with the accompanying drawings.

DETAILED DESCRIPTION OF THE PREFERRED EMBODIMENTS

Figure 1:
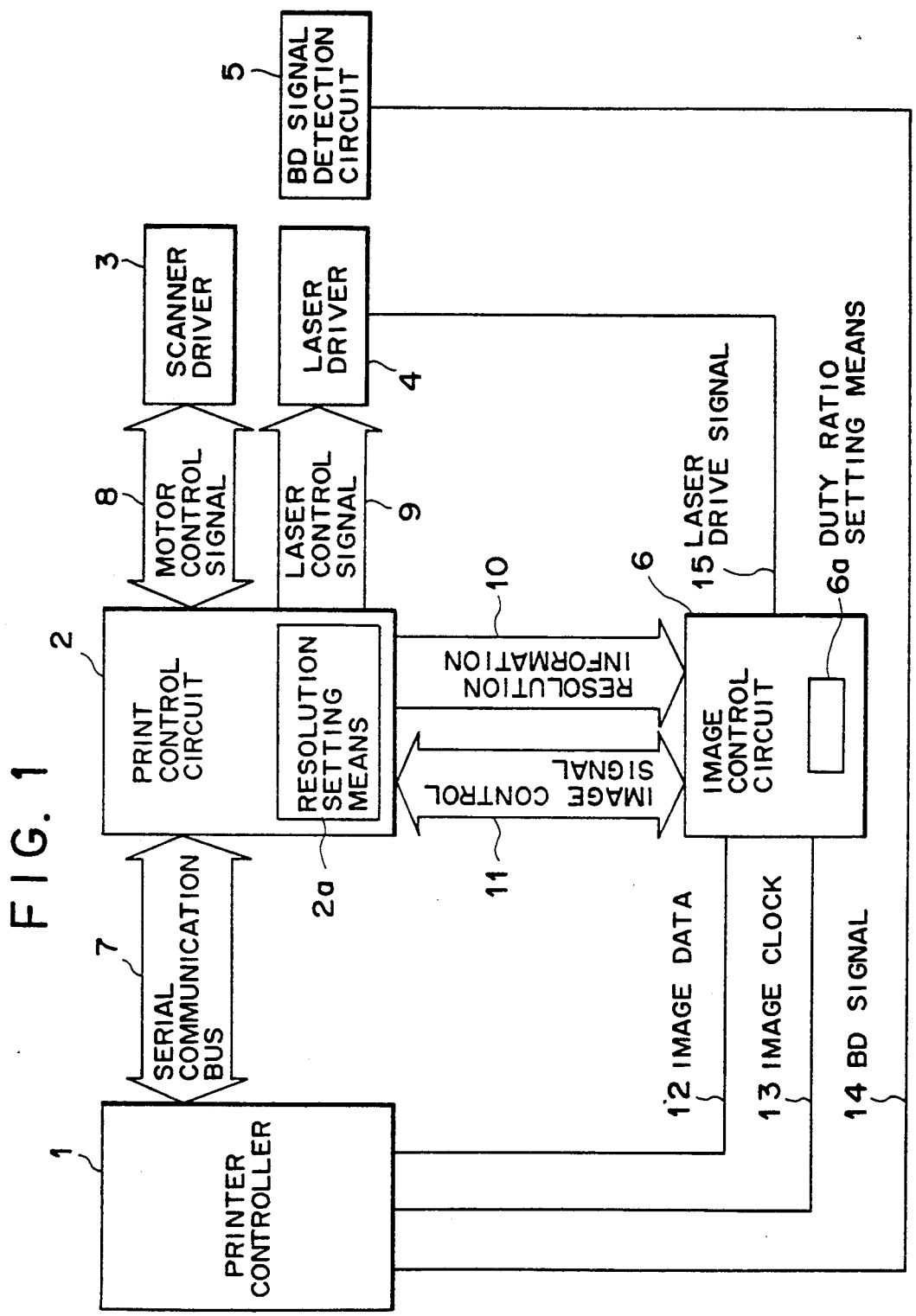
FIG. 1 is a block diagram of an image printing apparatus according to an embodiment of the present invention.

FIG. 1 is a block diagram showing an arrangement of an image printing apparatus according to an embodiment of the present invention. The image printing apparatus comprises a printer controller 1 having a bit map memory for developing image information from a host computer into video information which is then sent to a printer engine. The printer controller 1 serially sends to a print control circuit 2 print control information (e.g., a resolution change-over request) corresponding to bit information developed in the bit map memory. In synchronism with a BD signal 14 sent from a BD signal detection circuit 5, the printer controller 1 also outputs to an image control circuit 6 an image clock 13 having one period corresponding to one pixel of an image and image data 12 output at a trailing edge of the image clock 13.

The print control circuit 2 performs serial communication with the printer controller 1 and signals a state of the printer engine to the printer controller 1 and controls the printer engine state in response to a request such as a resolution change-over request from the printer controller 1.

When a resolution change-over request corresponding to a type of image information is designated from the printer controller 1 to the print control circuit 2, a resolution setting means 2a sets and changes over a frequency of the image clock 13 and a scanning speed of an optical scanning system in accordance with resolution information 10 corresponding to the image information (in this embodiment, a motor control signal 8 for changing a preset speed control constant of a scanner driver 3 is sent to the scanner driver 3). The resolution setting means 2a controls a scanner speed corresponding to the resolution. Note that the speed is increased as the resolution is increased.

The print control circuit 2 sends the resolution information 10 to the image control circuit 6 which generates a laser drive signal 15. A duty ratio setting means 6a in the image control circuit 6 controls a signal duty ratio of one period of the image clock 13 for a laser ON period to be a value corresponding to the resolution. A light beam having an optimal light amount corresponding to the resolution is incident on the image carrier in units of pixels.

A laser driver 4 causes to radiate on a photosensitive drum 100 a laser beam 105 ON/OFF-modulated by a laser control signal 9 and the laser drive signal 15 from the print control circuit 2.

The image control circuit 6 receives an image control signal 11 output from the print control circuit 2 and performs signal processing associated with resolution change-over and change-over operations of the image clock 13. The printer controller 1 is connected to the print control circuit 2 through a serial communication bus 7.

Figure 2:
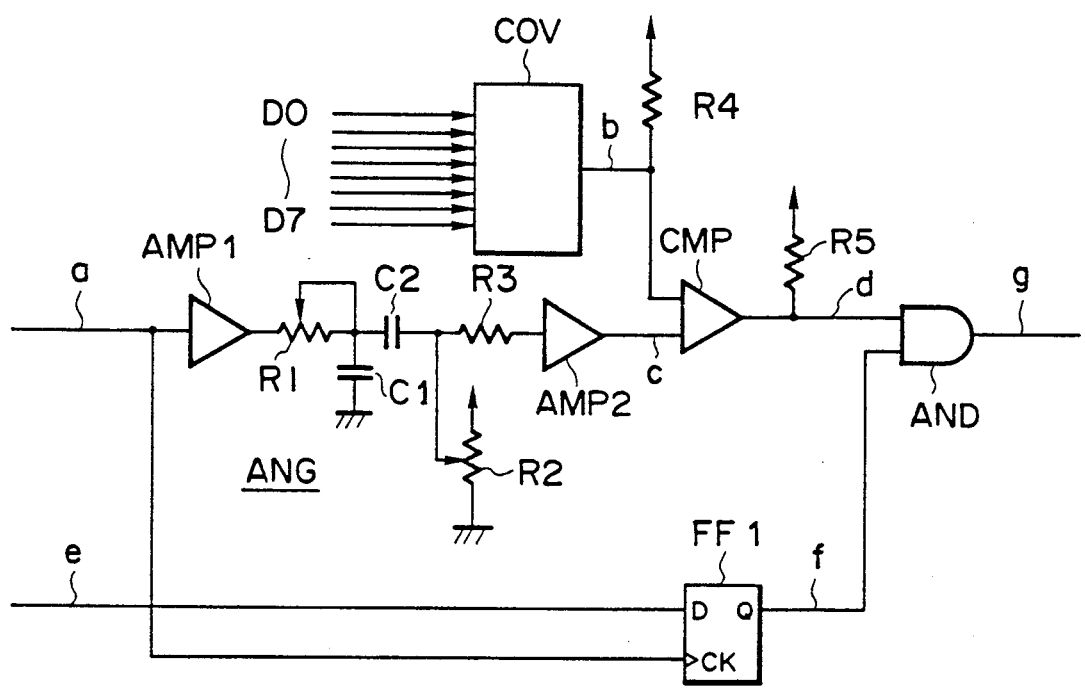
FIG. 2 is a circuit diagram for explaining an arrangement of an image control circuit shown in FIG. 1.

FIG. 2 is a circuit diagram for explaining an operation of the image control circuit 6 shown in FIG. 1. The same reference numerals as in FIG. 1 denote the same parts in FIG. 2.

An 8-bit data bus consists of bit lines D0 to D7. The data bus outputs the resolution information 10 to a D/A converter COV. The D/A converter COV outputs a threshold voltage b for determining the signal duty ratio to one input terminal of a comparator CMP. The image control circuit 6 also includes an gate circuit AND, a flip-flop FF1, resistors R1 to R5, capacitors C1 and C2, and amplifiers AMP1 and AMP2. The resistors R1 to R3, the amplifiers AMP1 and AMP2, and the like constitute a triangular wave generator ANG. A triangular wave c shown in FIG. 3 is input to the other input terminal of the comparator CMP.

The input image data 12 is output from a port e to the flip-flop FF1. The image clock 13 is input to a terminal D of the flip-flop FF1, and a signal f is output from its terminal Q to the gate circuit AND. A gate output is output from a port c to the laser driver 4 as the laser drive signal 15.

An operation of the circuit arrangement shown in FIG. 2 will be described with reference to FIG. 3.

Figure 3:
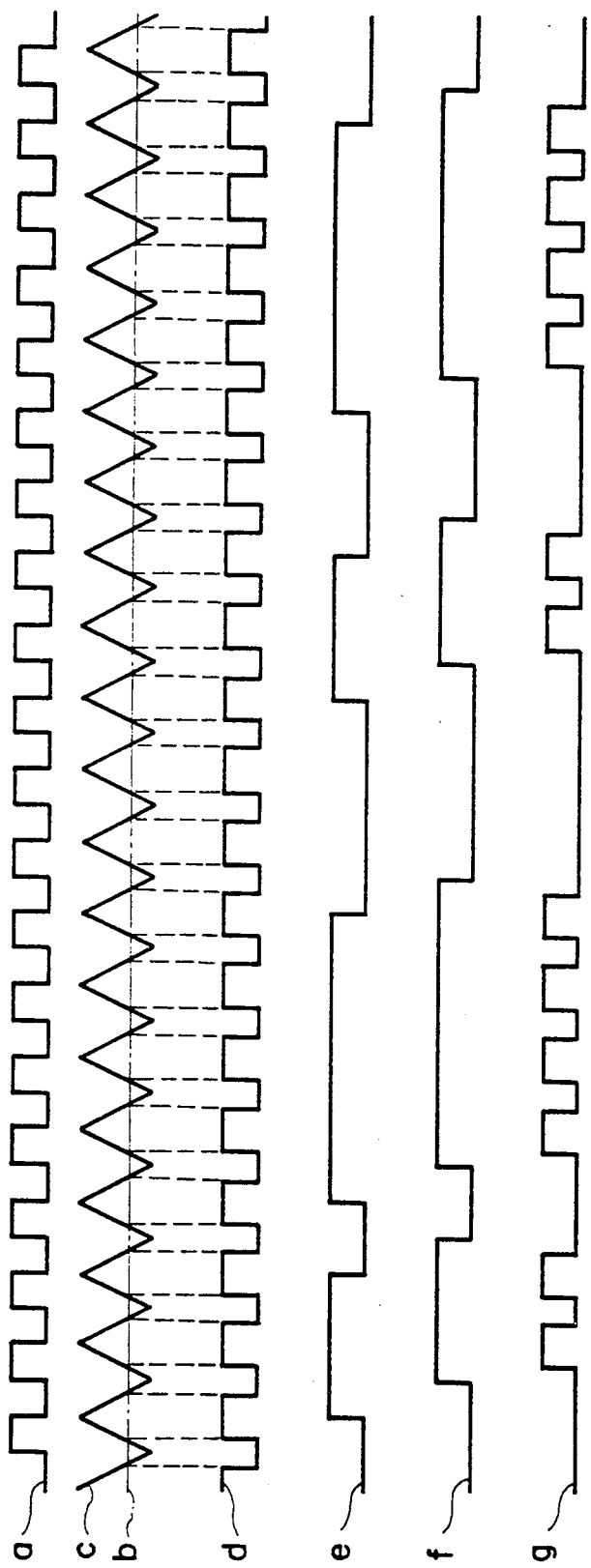
FIG. 3 is a timing chart for explaining an operation in FIG. 2.

FIG. 3 is a timing chart for explaining the operation of the circuit arrangement of FIG. 2.

When the resolution information 10 is signaled to the image control circuit 6 through the data bus (D0 to D7) shown in FIG. 2, the D/A converter COV outputs a triangular wave threshold voltage Vs for setting the signal duty ratio to the comparator CMP through a line b. The triangular wave (c) input to the comparator CMP is waveshaped by a threshold voltage (b) shown in FIG. 3, thereby obtaining the image clock 13(d) representing a signal duty corresponding to the resolution information 10.

On the other hand, the image data 12(e) is latched by the flip-flop FF1 at a leading edge of the image clock 13(a) and is output from the terminal Q to the gate circuit AND. The gate circuit AND outputs the laser drive signal 15 from its port g to the laser driver 4. In this case, the laser drive signal 15 is obtained by ANDing the signal f and the image clock (signal at the port d) having a signal duty ratio corresponding to the resolution information 10.

The laser drive signal 15 based on the conventional signal f becomes the laser drive signal 15 output from the port g. It is therefore possible to turn on the laser within a shorter period of time by one period of the image clock 13.

In the apparatus of the above embodiment, the image data 12 output from the printer controller 1 is serially processed line by line by the image control circuit 6. However, as shown in FIG. 4, the present invention is applicable to an apparatus for parallelly performing read and write access of the image data 12 by arranging a plurality of line buffers 17 and 18.

Figure 4:
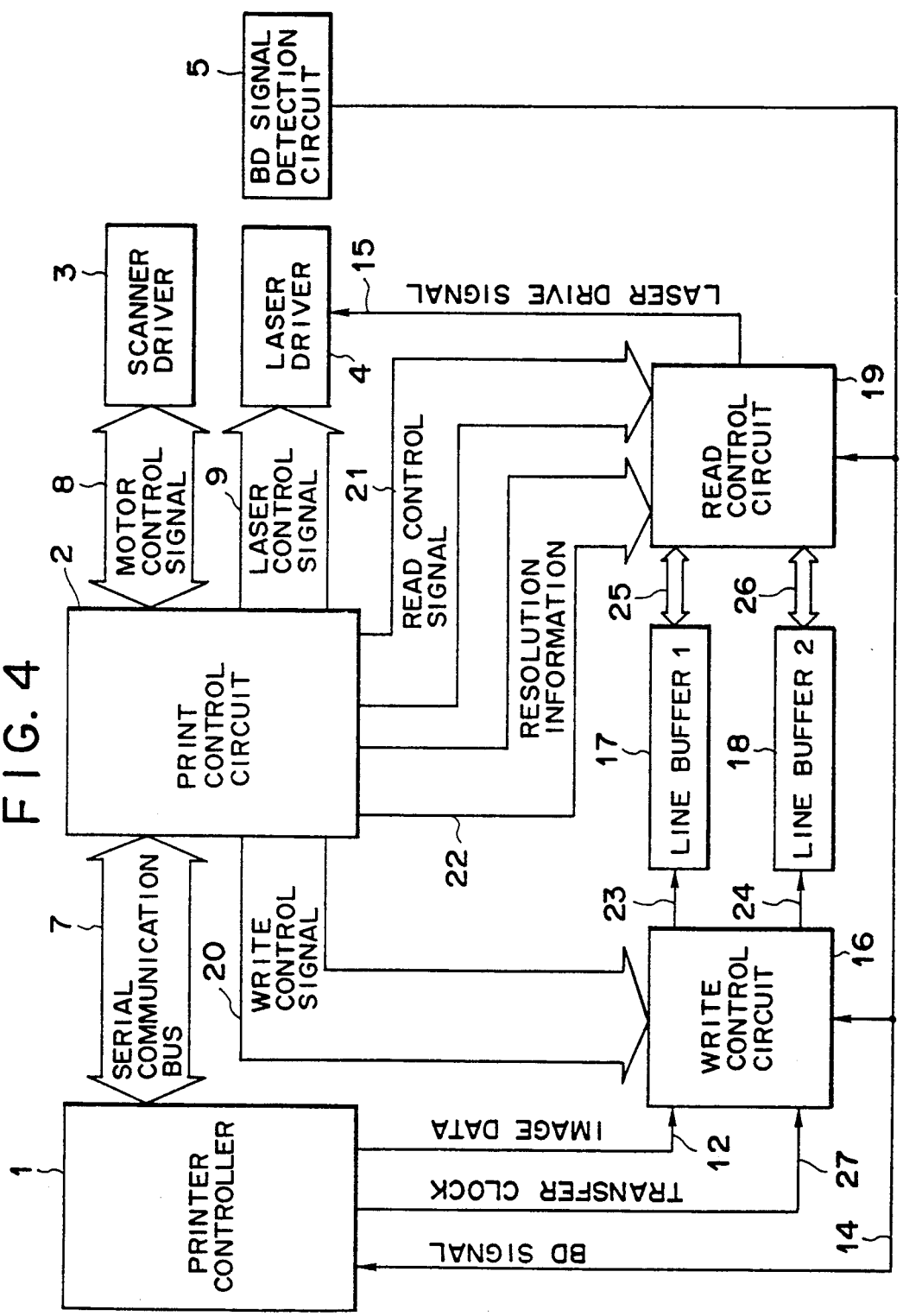
FIG. 4 is a block diagram showing an image printing apparatus according to another embodiment of the present invention.

FIG. 4 is a block diagram of an image printing apparatus according to another embodiment of the present invention. The same reference numerals as in FIG. 1 denote the same parts in FIG. 4.

Referring to FIG. 4, a write control circuit 16 sets the line buffer 17 or 18 in a write state in response to a write control signal 20 output from a print control circuit 2.

The line buffers 17 and 18 constitute a toggle circuit in which one line buffer is set in a read state while the other line buffer is set in a write state, and vice versa.

A read control circuit 19 sets the either the line buffer 17 or 18 in a read state in response to a read control signal 21 output from the print control circuit 2. The read control circuit 19 changes over a signal duty ratio of one period of an image clock 13 on the basis of resolution information 22 output from the print control circuit 2. This image printing apparatus generates write data 23 and 24, read data 25 and 26, and a transfer clock 27.

Figure 5:
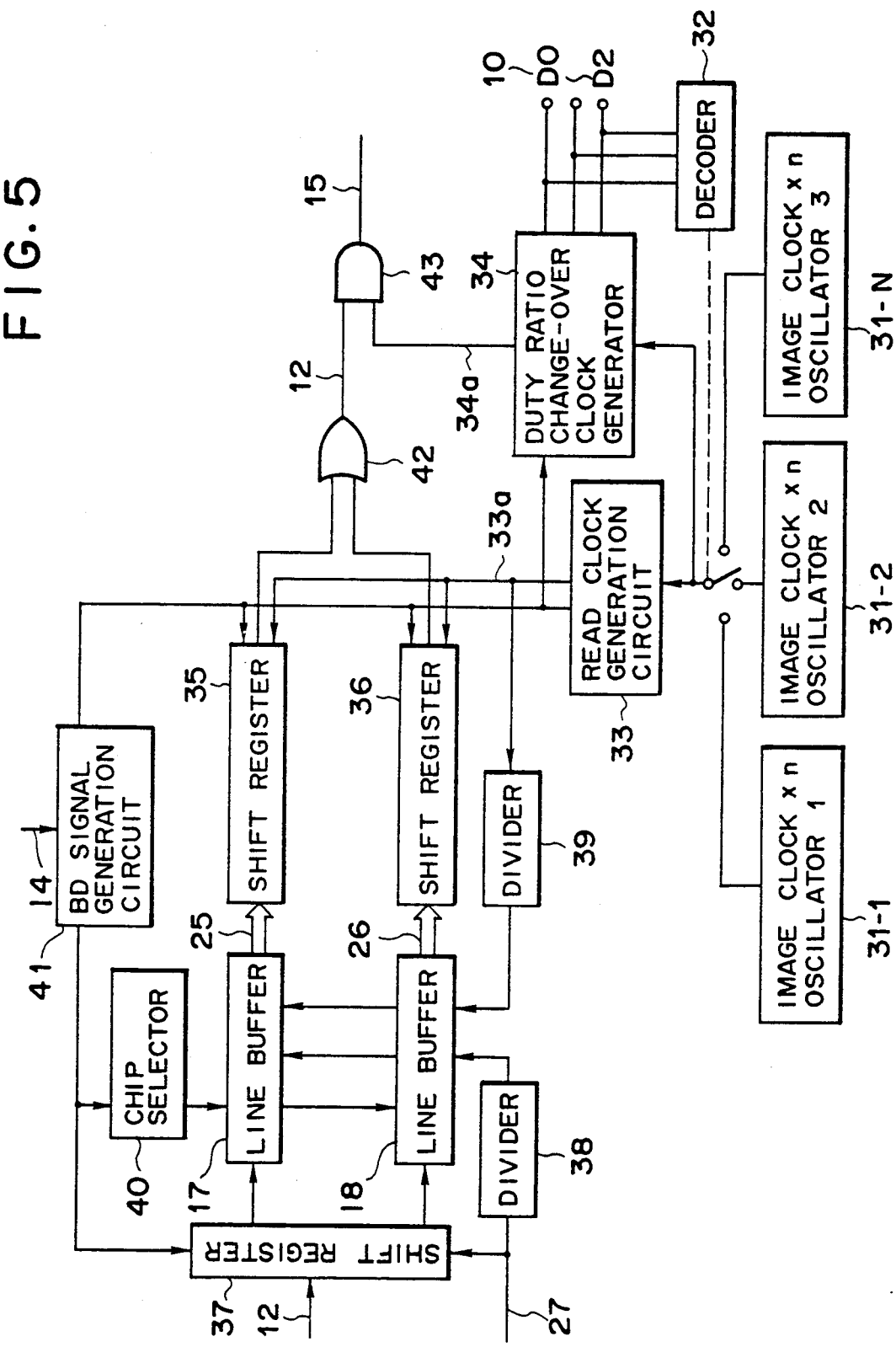
FIG. 5 is a block diagram showing a detailed arrangement of a read control circuit shown in FIG. 4.

FIG. 5 is a block diagram showing a detailed arrangement of the read control circuit 19 shown in FIG. 4. The same reference numerals as in FIG. 4 denote the same parts in FIG. 5.

The read control circuit 19 includes image clock Xn oscillators 31-1 to 31-N for generating clocks having frequencies corresponding to recording resolutions, i.e., generate clock signals having frequencies (n times of the frequency of the image clock 13; eight times in this embodiment) corresponding to the resolutions. The resolutions are 300 DPI, 400 DPI, and 600 DPI. A decoder 32 decodes resolution data having bits D0 to D2 designated by resolution information 10 and selects one of the oscillators 31-1 to 31-N. A read clock generator 33 receives a BD signal 14 through a BD signal generator 41, counts 8-time image clocks from the leading edge by a predetermined number (3 in the embodiment shown in FIG. 6), and starts to frequency-divide the clock, thereby obtaining an image clock 33a.

An internal counter in a duty change-over clock generator 34 counts the selected 8-time image clocks by a complement of a 3-bit value, and is then reset to input a duty change-over clock 34a having a larger duty ratio of the image clock to a gate circuit 43.

Shift registers 35 and 36 read out image data 12 stored in line buffers 17 and 18 in synchronism with a read clock from the clock generator 33. The readout image data is output to the gate circuit 43 through a gate circuit 42.

A shift register 37 writes the image data 12 sent from a printer controller 1 in the line buffers 17 and 18 in synchronism with the transfer clock 27. A frequency divider 38 outputs a clock obtained by frequency-dividing the transfer clock 27 to the line buffers 17 and 18. A frequency divider 39 outputs a clock obtained by frequency-dividing the image clock 33a to the line buffers 17 and 18. A chip selector 40 controls read/write enable states of the line buffers 17 and 18. The BD signal generator 41 waveshapes the input BD signal 14 and outputs a horizontal sync signal to the respective parts.

Figure 6:
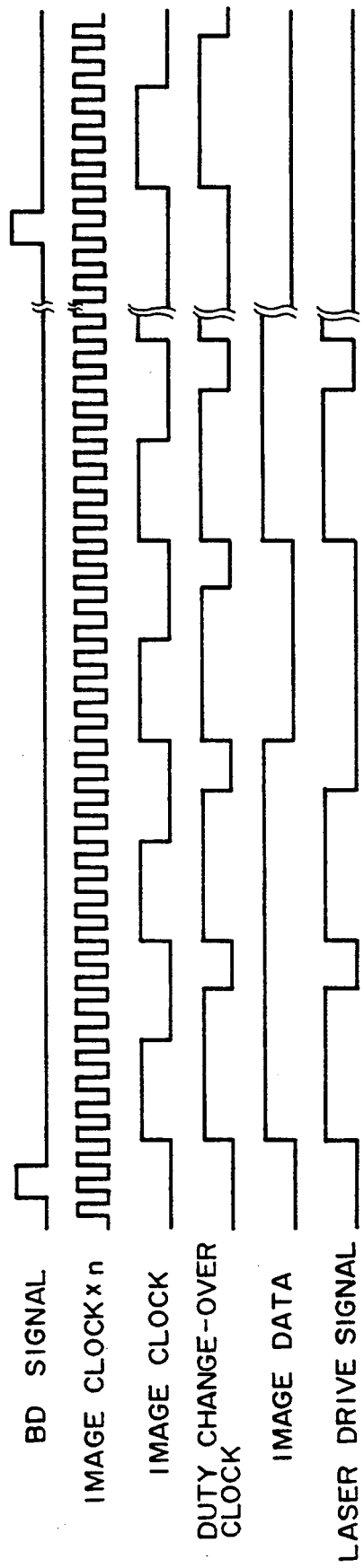
FIG. 6 is a timing chart for explaining an operation of the arrangement shown in FIG. 5.

FIG. 6 is a timing chart for explaining an operation of the circuit arrangement shown in FIG. 5.

As is apparent from FIG. 6, when the image data 12 synchronized with the image clock 33a having a frequency which is n times the frequency of the original image clock 13 is to be processed after a trailing edge of the BD signal 14, the internal counter in the duty change-over clock generator 34 counts 8-time image clocks by a complement of a 3-bit value in accordance with the resolution data (D0 to D2) and is then reset to generate the duty change-over clock 34a. The duty change-over clock 34a is output to the gate circuit 43. The duty of the image clock 13 defined by one of the oscillators 31-1 to 31-N which is selected by the resolution is changed over, thereby obtaining the laser drive signal 15 based on the image data.

In the above embodiment, the duty change-over clock 34a is generated by the read control circuit 19. However, as shown in FIG. 7, the duty change-over clock may be generated by an internal clock circuit in a printer controller 1.

Figure 7:
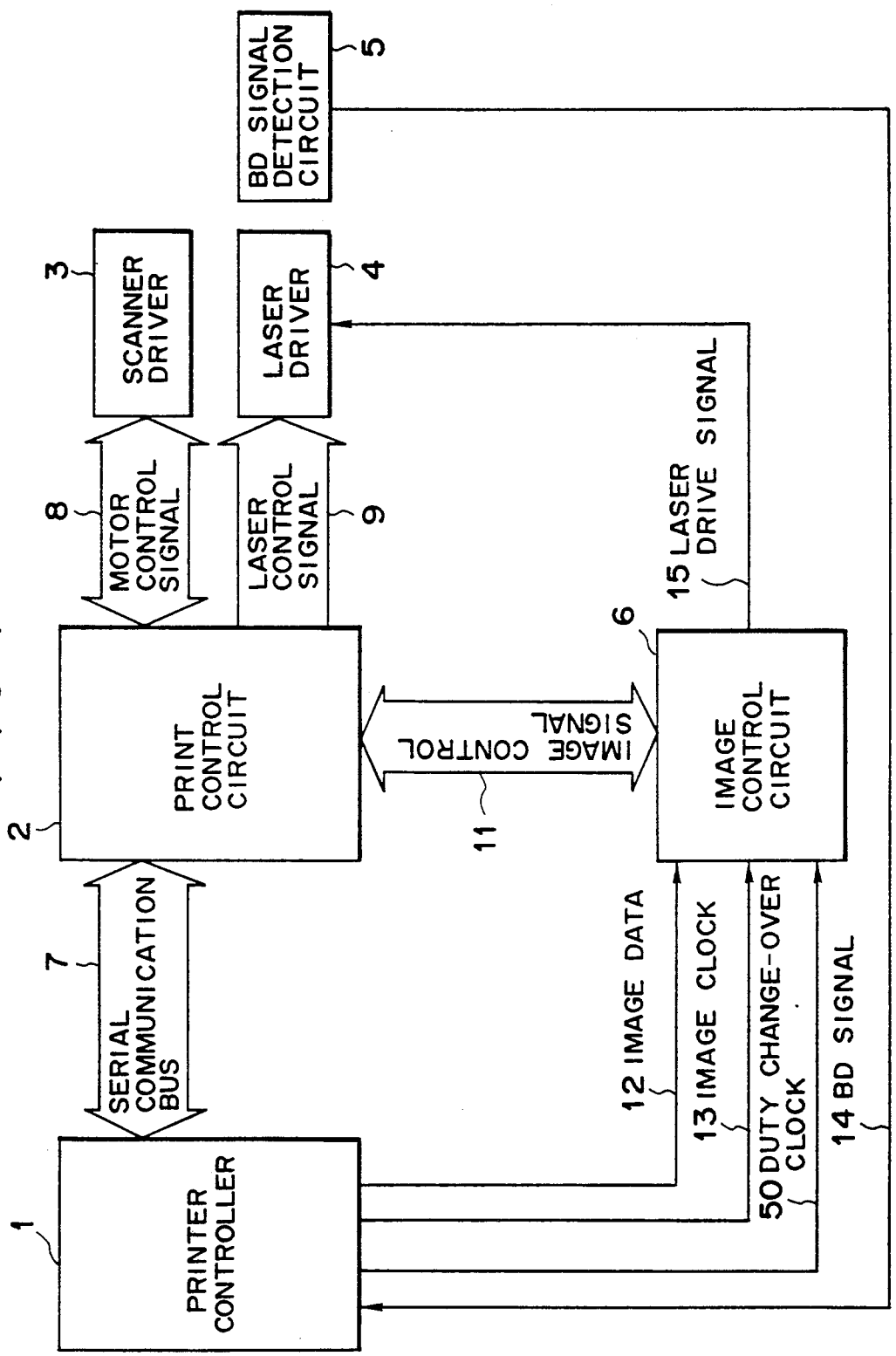
FIG. 7 is a block diagram for explaining an arrangement of an image printing apparatus according to still another embodiment of the present invention.
Figure 8:
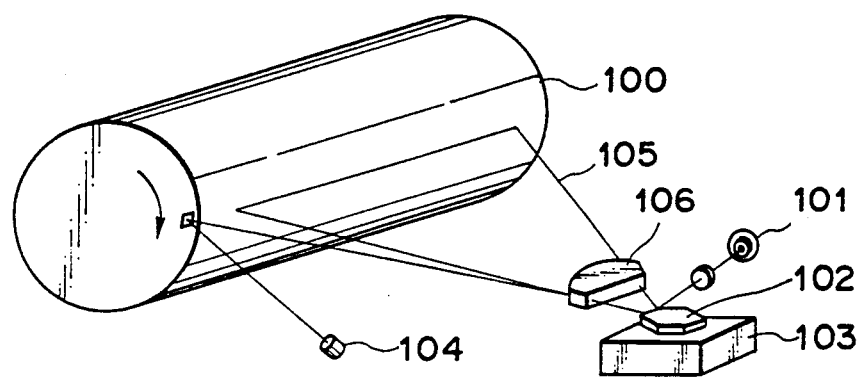
FIG. 8 is a perspective view for explaining an image forming theory in a conventional image printing apparatus.
Figure 10:
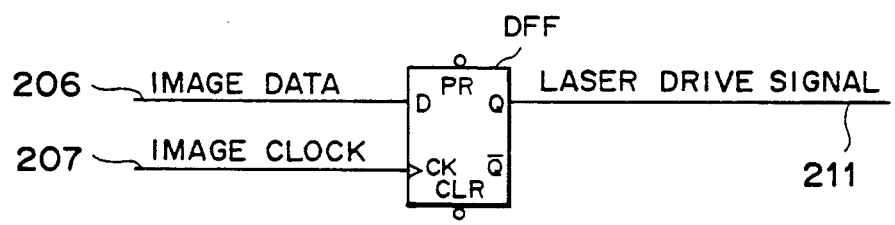
FIG. 10 is a block diagram of an arrangement of an image control circuit shown in FIG. 9.
Figure 11:
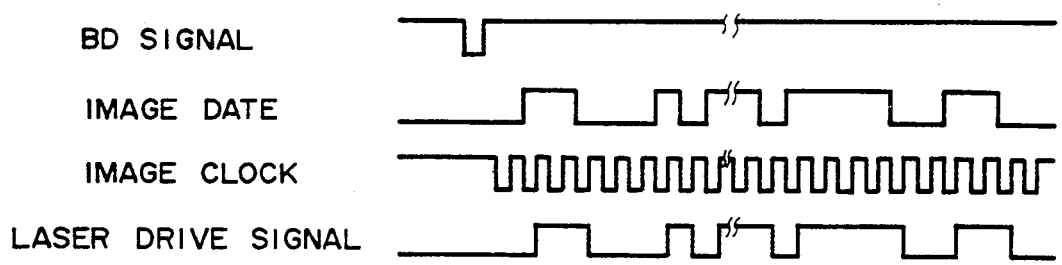
FIG. 11 is a timing chart for explaining operations of the respective parts shown in FIG. 9.
Figure 9:
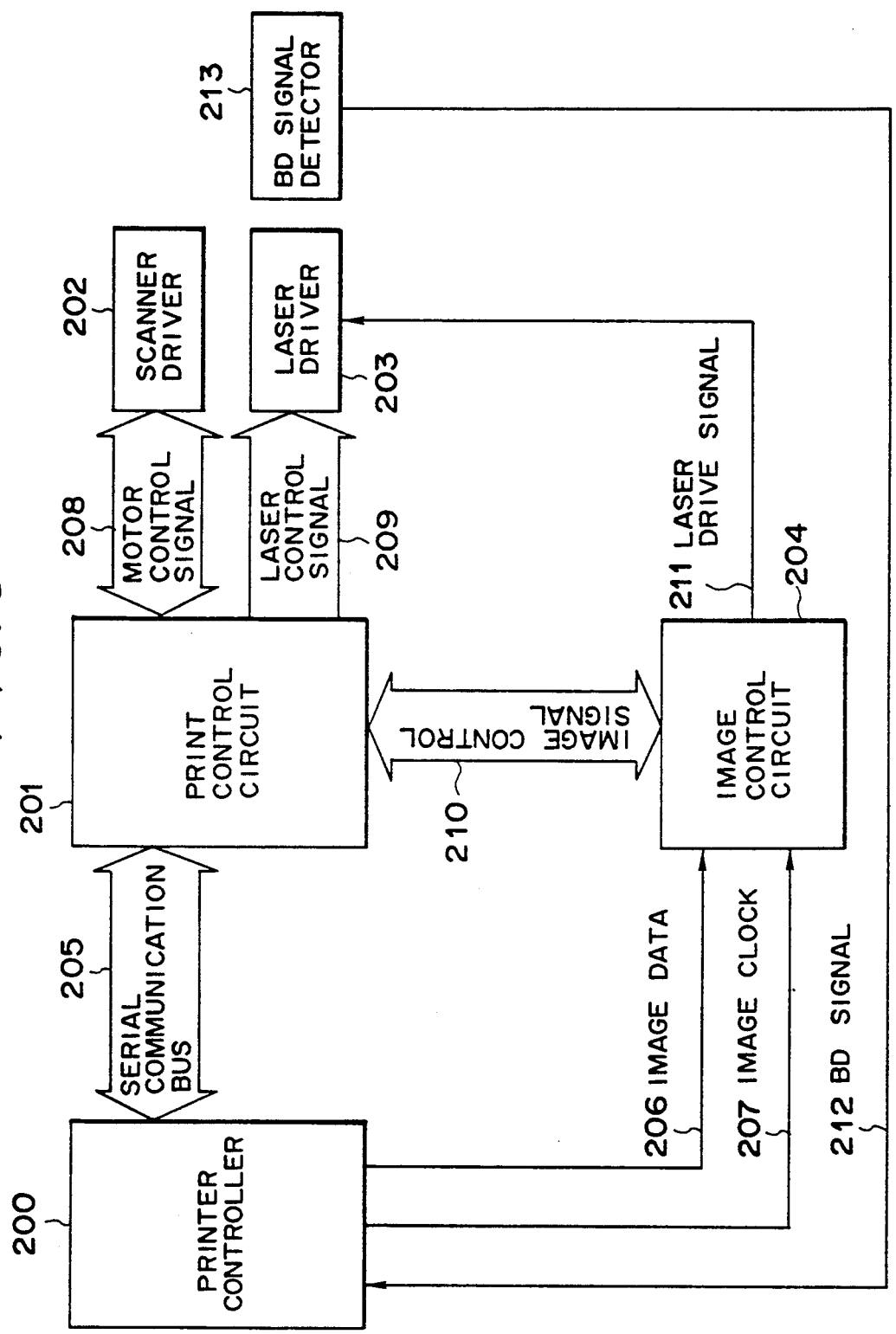
FIG. 9 is a control block diagram showing a control arrangement of the image printing apparatus shown in FIG. 8.

FIG. 7 is a block diagram showing an arrangement of an image printing apparatus according to still another embodiment of the present invention. The same reference numerals as in FIG. 1 denote the same parts in FIG. 7.

A duty change-over clock 50 is generated by an internal clock circuit in a printer controller 1 and is output to an image control circuit 6.

The printer controller 1 analyzes image information input from a host computer and generates the duty change-over clock 50 corresponding to a desired resolution when the resolution change-over operation is required and is output to the image control circuit 6. In this case, image data 12 is output to the image control circuit 6 in synchronism with an image clock 13 and is ANDed with the duty change-over clock 50 to obtain a laser drive signal 15. The laser drive signal 15 is output to a laser driver 4. Therefore, modifications of a conventional circuit can be minimized, and the laser drive signal 15 corresponding to the desired resolution can be generated and output at low cost.

As has been described above, there are provided a resolution setting means for setting and changing over a frequency of an image clock signal and a scanning speed of an optical scanning system in accordance with resolution information designated by image information and a duty ratio setting means for changing over a signal duty ratio of the image clock signal having a predetermined frequency set by the resolution setting means in accordance with the designated resolution. A light beam ON time for one pixel can be optimally set without changing a beam spot size while the image clock is changed over in correspondence with the resolution. The image quality of a thin line image can be greatly improved as compared with an image based on the conventional image clock. Therefore, the line width of an image during formation of a vertical line image will not be increased, and thin lines such as a table image serving as a format image and rulers can be drawn, thus providing many practical advantages.

What is claimed is:

1. An image recording apparatus for recording an image at different resolutions, comprising:
    first output means for outputting two-valued image information;

second output means for generating a clock whose period corresponds to one pixel of an image to be recorded;

setting means for setting one of at least first and second resolutions of the image to be recorded;

conversion means which is common for both the first and second resolutions for receiving the clock output by said second output means, for converting the received clock into an image clock whose duty ratio of ON time corresponds to the resolution set by said setting means, and for outputting a signal corresponding to the image clock;

a beam generator for generating a light beam; and control means for outputting a drive signal for driving said beam generator such that the ON time of the light beam is controlled within one pixel of the image, said control means outputting the drive signal on the basis of the image information output by said first output means and on the basis of the signal output by said conversion means.

2. An image recording apparatus according to claim 1, further comprising a photosensitive member onto which the light beam is applied, and scanning means for scanning said photosensitive member with the light beam.

3. An image recording apparatus according to claim 1, wherein said conversion means continuously changes the duty ratio of the image clock converted by said conversion means.

4. An image recording apparatus according to claim 1, wherein said conversion means comprises generation means for generating a triangular wave signal on the basis of the image clock converted by said conversion means and comparison means for comparing said triangular wave signal with a signal whose level corresponds to the resolution, and wherein said conversion means outputs the image clock having the duty ratio corresponding to the resolution on the basis of an output of said comparison means.

5. An image recording apparatus according to claim 1, wherein said first output means outputs the clock having a frequency which corresponds to the resolution set by said setting means.

* * * * *